United States Patent [19]

Deutsch

[11] 4,111,090
[45] Sep. 5, 1978

[54] NOISE REDUCTION CIRCUIT FOR A DIGITAL TONE GENERATOR

[75] Inventor: Ralph Deutsch, Sherman Oaks, Calif.

[73] Assignee: Kawai Musical Instrument Mfg. Co. Ltd., Hamamatsu, Japan

[21] Appl. No.: 733,141

[22] Filed: Oct. 18, 1976

[51] Int. Cl.² .............................................. G10F 1/00
[52] U.S. Cl. ........................................ 84/1.01; 84/1.03
[58] Field of Search ...................... 84/1.01, 1.03, 1.11, 84/1.12, 1.17, 1.19, 1.21, 1.27

[56] References Cited

U.S. PATENT DOCUMENTS

| 3,515,792 | 6/1970 | Deutsch | 84/1.03 |
| 3,982,460 | 9/1976 | Obayashi | 84/1.01 |
| 4,036,096 | 7/1977 | Tomisawa | 84/1.01 |

Primary Examiner—Robert K. Schaefer
Assistant Examiner—William L. Feeney
Attorney, Agent, or Firm—Christie, Parker & Hale

[57] ABSTRACT

A noise suppression circuit for digital tone generator in which a table of digitized data points are converted at a rate controlled by the fundamental frequency of the tone being generated. The suppression circuit determines the difference between each pair of successive data points and increments the prior data point in a succession of equal intermediate steps proportional to said difference. The data points together with the succession of incremented values between said data points are converted by a digital-to-analog converter at a converter rate equal to or greater than the maximum rate at which each data point is incremented.

4 Claims, 4 Drawing Figures

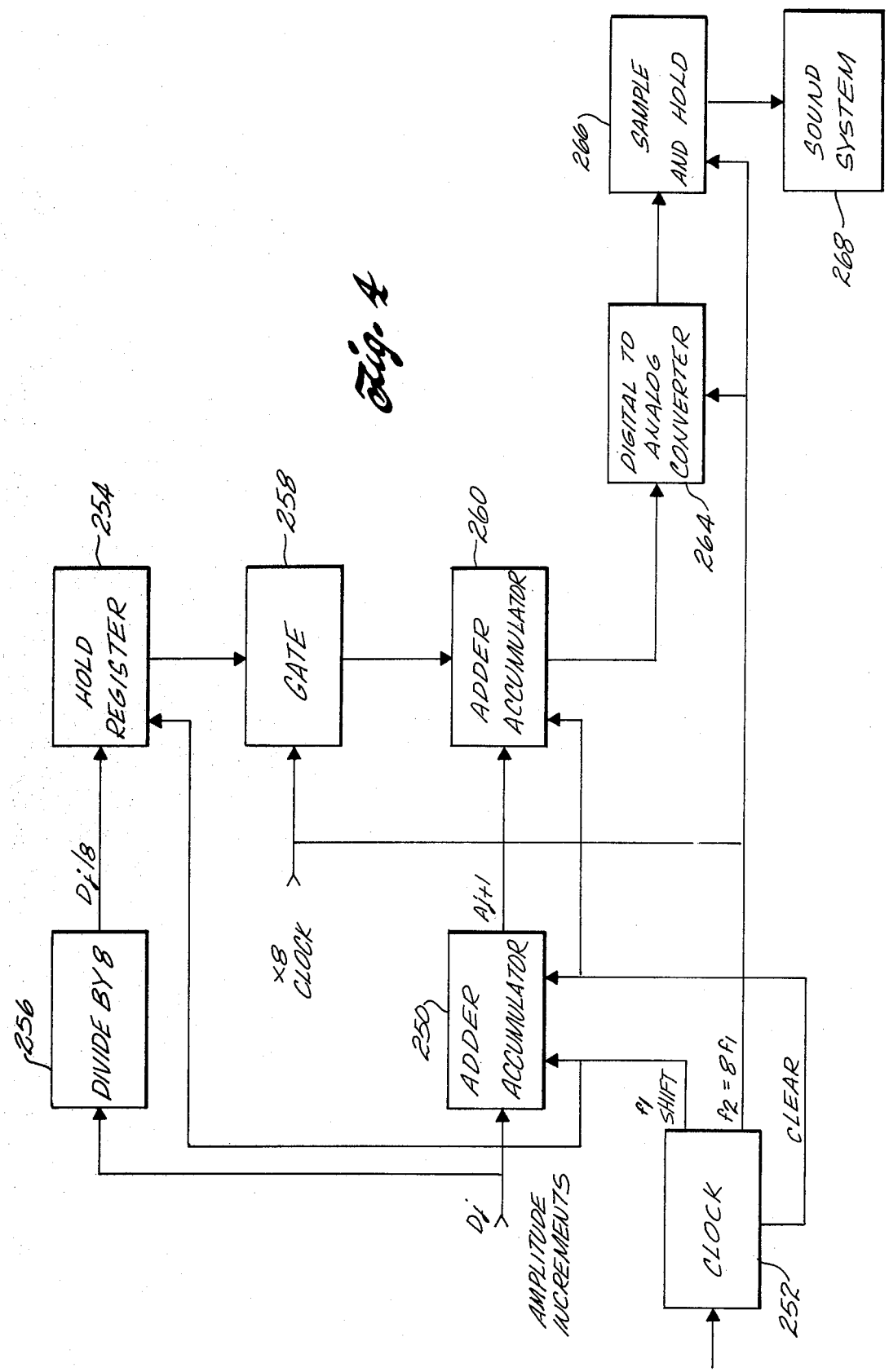

NOISE REDUCTION CIRCUIT FOR A DIGITAL TONE GENERATOR

FIELD OF THE INVENTION

This invention relates to digital tone synthesizers, and more particularly, to a noise suppression circuit for reducing unwanted noise frequencies being generated by the zero-order sample-hold circuits used in digital-to-analog decoding.

BACKGROUND OF THE INVENTION

Polyphonic tone synthesizers which utilize digital data to generate musical tones are well known. U.S. Pat. No. 3,515,792, for example, describes a digital organ in which waveshape data is stored in memory and is used to generate one or more musical notes of predetermined waveshape at fundamental frequencies determined by the keys selected on a keyboard. The digital data is converted to an audio signal by a digital-to-analog converter. Another tone synthesizer using digital information to provide a computer organ is described in U.S. Pat. No. 3,809,786 in which the digital data defining the waveform of the desired sound is computed in real time in response to operation of one or more keys on a keyboard. Again the digital data is converted to an audio signal by a digital-to-analog converter system. In copending application Ser. No. 603,776, filed Aug. 11, 1975, entitled "Polyphonic Tone Synthesizer" there is described a synthesizer having a plurality of separate tone generators. Each tone generator includes a Shift register for storing waveform data, the data being shifted out at a rate controlled by a Note clock, the frequency of the Note clock being determined by the particular key selected on a keyboard. The data transferred out of the shift register is applied to a digital-to-analog converter to generate the corresponding audio signal of the desired waveform. In each of these systems, the digital-to-analog converter includes a sample and hold circuit commonly referred to as a zero-order sample and hold, or sometimes referred to as a "boxcar" detector. Digital numbers are converted to analog voltages applied to the sound system by converting each digital number to an analog voltage whose instantaneous amplitude is directly determined by the magnitude of the digital number. A sample and hold circuit then maintains the voltage level at the output until the next digital number in sequence can be converted to its corresponding voltage.

It is characteristic of such a digital conversion system, in which the data occurs at periodic intervals, that the spectral components are imaged at all integer multiples of the periodic interval. In the case of the digital-to-analog converter, this periodic interval is the period at which successive conversions are made is frequently referred to as the sampling period.

The effectiveness of a zero-order sample and hold circuit as an extrapolating device for the digital-to-analog conversion depends upon the sampling frequency in relation to the highest frequency term in the spectral content of the digital data sequence. In general, the higher the sampling frequency in comparison to the highest frequency term in the digital data sequence, the more effective is the suppression of unwanted harmonic components. In the digital tone generators of the type described in the above-identified patents, the sampling frequency for the digital-to-analog converter was selected to be higher than the minimum effective sampling rate for the highest frequency harmonic. In the systems described, the fundamental frequency of the highest note $C_7$ is $f_{C7} = 2093$ hz. The sampling frequency $f_s$ then was made in excess of $2 \times 16 \times 2093 = 66.976$ KHZ, which is twice the frequency of the 16th harmonic of the highest note on the keyboard. Considering the case in which the note $C_2$ having a frequency of 65.4 hz. is played, there is negligible attenuation of the fundamental frequency by the zero-order sample and hold circuit. At the image frequency $f_s - f_{C2}$, the zero-order sample and hold circuit should theoretically provide an attenuation of $-60.2$ db for the image signal.

However, in the case of the tone generators such as described in the above-identified patents, there are fixed number of sample points per cycle of the tone being generated, e.g., 32 distinct sample points per cycle of the audio signal being generated. Thus the effective sampling frequency is limited in such case to 32 times the fundamental frequency of the tone beong generated. Therefore, even though the digital-to-analog converter samples the data at a much higher frequency, no additional information is derived by the higher sampling rate, since successive samplings by the converter simply repeat the same points.

Since the effective sampling rate is only 32 times the fundamental, the image frequency for $C_2$ is only 2027:62 and the zero-order sample and hold provides a theoretical attenuation of only $-29.8$ db. While this would appear to be a substantial level of attenuation, the sensitivity of the human ear is much greater at the image frequency of 2027.6 hz than at the fundamental frequency of 65.4 hertz. The curves of equal loudness as a function of frequency for the human ear, first developed by Fletcher & Munson in 1933, show a difference in loudness level of 18 db for the two frequencies. Thus the ear is about 18 db more sensitive at the image frequency produced by the sampling process described in the above-identified patents than at the fundamental frequency. Thus instead of having an effective attenuation of $-29.8$ db, because of ear sensitivity, this is reduced at about $-11.8$ db. Even if the number of data samples was increased from 32 points to 64 points, as provided in the polyphonic tone systhesizer described in the above-identified copending application thereby doubling the image frequency because of ear sensitivity, the effective attenuation still is no greater than $-16$ db which is insufficient to prevent the unwanted image frequency from being noticeably heard.

One obvious solution to the reduction of sounds that the image frequencies produce by the sampling process is to use low-pass filters following the digital-to-analog conversion. Such an arrangement is only possible if each tone is generated through an independent channel. Even so, the cutoff frequency of the filter would have to change with the fundamental frequency of the note being generated. Low-pass filters cannot be used at all in the digital organ described in the U.S. Pat. No. 3,515,792, for example, where a time multiplexing is used so that the tone generator shares common digital channels and a single output digital-to-analog conversion channel.

SUMMARY OF THE INVENTION

The present invention is directed to a circuit arrangement for improving the attenuation characteristics of a zero-order sample and hold decoder for a digital tone generator. This circuit achieves the improved attenuation characteristics without increasing the number of data points in each fundamental period of a tone being synthesized and without increasing the clock rate of the tone generating system. This is accomplished, according to the present invention, by providing a circuit for implementing linear interpolation between successive digital data points. In one embodiment of the invention at least seven additional data points are inserted by an interpolation of circuit between each two consecutive data points of the original sequence. The sampling rate is thereby effectively increased by a factor of eight. This is accomplished, in brief, by providing a circuit arrangement in which stored data words defining the amplitudes of a succession of sample points on the audio signal are transferred successively to first and second registers at a rate determined by the pitch of the note being generated. In addition, data words as they are transferred from the first register to the second register are also transferred to the input of a digital-to-analog converter at the same predetermined rate. Subtracting and dividing means coupled to the first and second registers generates an output signal proportional to the difference in value of the digital words in the two registers. This difference signal is used to repeatedly increment the value of input from the first register to the digital-to-analog converter, at a rate substantially greater than said predetermined rate. The digital-to-analog converter is operated at a sampling rate equal to or greater than the incrementing rate.

DESCRIPTION OF THE DRAWINGS

For a better understanding of the invention reference should be made to the accompanying drawings, wherein:

FIG. 4 is yet another embodiment of the present invention applicable where the digital data represents changes in amplitude from sample to sample.

DETAILED DESCRIPTION

Figure 1:
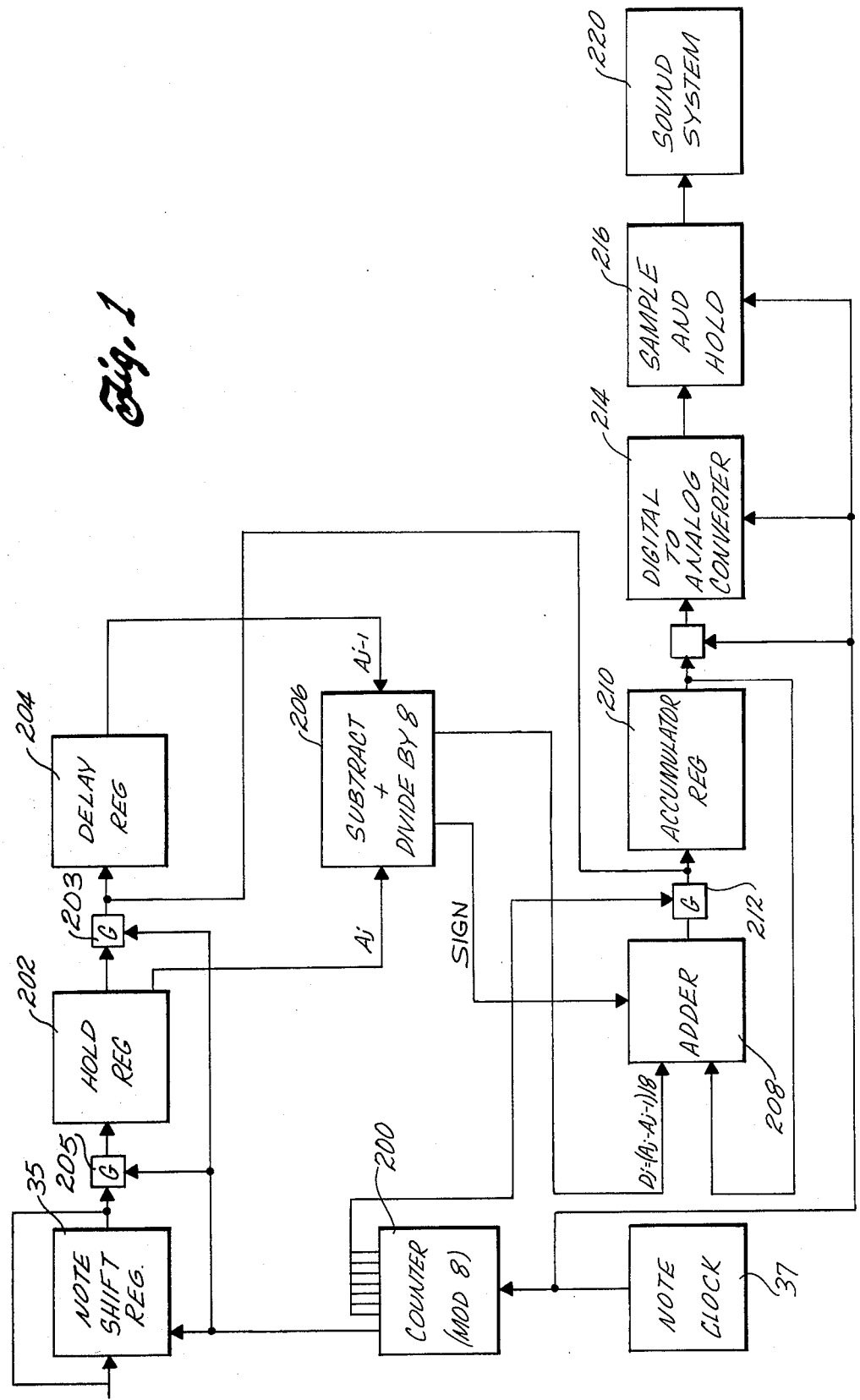
FIG. 1 is a block diagram of one embodiment of the present invention for operation with a single tone generator.

Referring to FIG. 1, there is shown in block diagram form a noise reduction circuit particularly adapted to operating in conjunction with a tone generator of the type described in the above-identified copending application Ser. No. 603,776. As therein described, a digital tone generator includes a Note shift register 35. The Note shift register is loaded with a plurality of digitally coded words, each word representing the amplitude of a sample point on the waveform of the tone to be generated. The number of words stored in the Note shift register corresponds to the number of sample points used to define one cycle of the audio signal being generated. The number of sample points is a fixed predetermined number, for example, 64. This data is repeatedly shifted out of the Note shift register at a rate determined by the fundamental or pitch of the audio tone being generated. To this end shift pulses are derived from a Note clock 37 whose frequency is controlled so as to be directly proportional to the fundamental frequency of the tone being generated. The manner in which the frequency of the Note clock is controlled as described in more detail, for example, in copending application Ser. No. 634,533, filed Nov. 24, 1975, entitled "Frequency Number Controlled Clocks." The Note clock, as described in the above-identified application, operates at a multiple of 64 times this fundamental frequency of the tone being generated, so that the 64 data words are read out of the shift register in one period of the fundamental frequency.

In the present embodiment, the frequency of the Note clock 37 is controlled so as to be a multiple of 8 × 64 of the fundamental frequency of the note being generated. The output from the Note clock 37 is applied to a modulo 8 counter 200 which operates as a divide by 8 circuit for in effect coupling every 8th clock pulse to the shift input of the Note shift register 35. Thus the Note shift register 35 is still shifted 64 times during one period at the fundamental frequency of the tone being generated.

As each word is shifted out of the register 35, it is fed back to the input of the Note shift register 35 and also is coupled to a Hold register 202. The prior contents of the Hold register 202 is in turn coupled to a Delay register 204. Thus if $A_j$ represents a data word transferred to the Hold register 202 from the shift register at time $t_j$, then the word $A_{j-1}$ is stored in the Delay register 204 at time $t_j$. The transfer of data words from the Note shift register 35 to the Hold register and from the Hold register to the Delay register is synchronized with the shift pulses derived from the counter 200.

The contents of the Hold register 202 and the Delay register 204 are applied to the two inputs of a Subtract and Divide by 8 circuit 206. The circuit 206 subtracts the value $A_{j-1}$ in the Delay register 204 from the value $A_j$ in the Hold register. The difference value is then divided by eight by shifting the binary digits of the difference value three places to the right. The value $D_j$ of the output of the Subtract circuit 206 then is equal to $(A_j - A_{j-1})/8$. This output value, including the algebraic sign, is applied to an adder 208. The adder adds the value $D_j$ to the value stored in an accumulator register 210. The current value in the accumulator register 210 at time $t_j$ is $A_{j-1}$ as derived from the output of the Hold register 202 through a gate 203 with every 8th clock pulse in response to the output of the counter 200. The output of the adder is gated to the input of the accumulator 210 by a gate 212 with each of the seven remaining clock pulses derived from the counter 200. Thus the contents of the accumulator 210 is incremented seven times following each clock pulse at time $t_j$ from the Note clock 37 by the output of the Subtract and Divide circuit 206. With the next clock pulse at time $t_{j+1}$, the accumulator is loaded with the data word $A_j$ derived from the Hold register 202 at the same time the Hold register receives the next data word $A_{j+1}$ from the shift register 35 through a gate 205.

As the contents of the accumulator 210 are incremented in synchronism with the Note clock 37, each incremented value is coupled to a digital-to-analog converter 214 which converts each digital value to a proportional voltage level that is maintained between successive conversions by a sample and hold circuit 216. The voltage output from the sample and hold circuit 216 is applied to the sound system 220, the successive voltage samples defining the desired waveform.

It will be seen that each data word is transferred from the Note shift register 35 to the Hold register 202 to the accumulator 210 with every 8th clock pulse from the Note clock 37. Between transfers of the data word to the accumulator, the contents of the accumulator 210 are incremented seven times by a incremental amount corresponding to one-eighth the difference between the successive data points derived from the shift register 35. Thus the circuit in effect interpolates between data words to smooth out the steps between successive data points by dividing each step into eight incremental steps. The sampling rate of the digital-to-analog converter 214 is at the same frequency as the interpolation rate, namely, at the frequency of the output of the Note clock 37. It should be noted, however, that the digital-to-analog converter 214 and sample and hold circuits 216 can be operated at any frequency which is equal to or greater than the interpolation frequency set by the Note clock 37.

Figure 2:
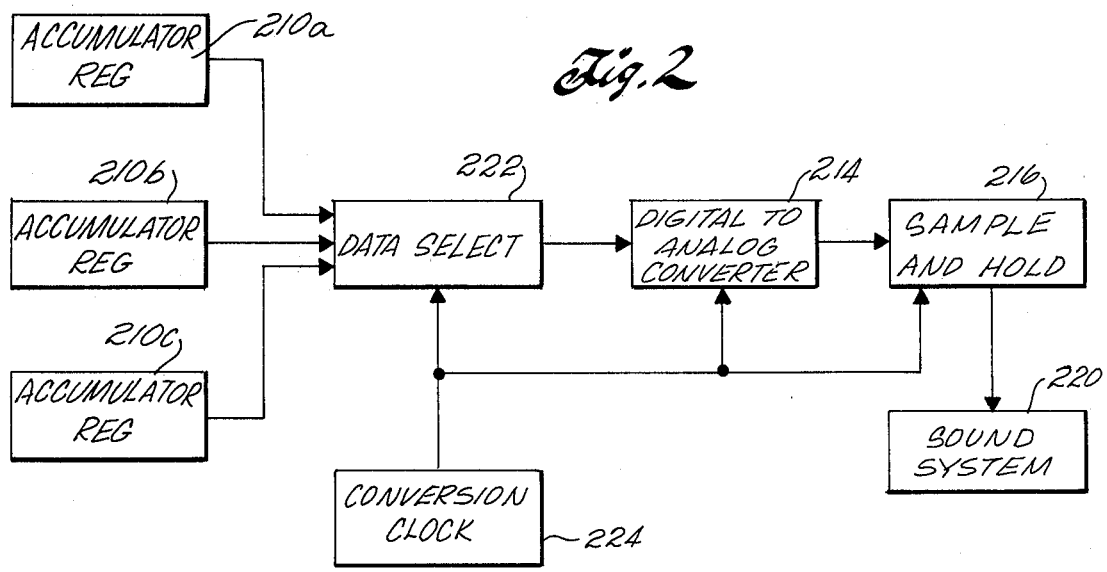
FIG. 2 is a block diagram of a modification to the circuit of FIG. 1 for operation with multiple tone generators.

The circuit as described in connection with FIG. 1 discloses a noise suppression circuit for a single tone generator. This circuit may be duplicated for each tone generator with the analog voltage output from the sample and hold circuit of each tone generator being coupled to the sound system through a summing network which sums the audio signal voltages from all of the tone generators. Alternatively, as shown in FIG. 2, the accumulator for each tone generator, as indicated at 210a, 210b, and 210c, may be applied to a single digital-to-analog converter 214 on a time-shared basis through a data select circuit 222. The data select circuit is a high-speed switching or commutator circuit driven from a conversion clock source 224 having a frequency which is at least as high as a multiple of the highest frequency of the Note clock 37, where the multiple corresponds to the maximum number of tone generators sampled by the data select circuit.

It should be noted that the circuit of FIG. 1 may also be used as a noise suppression circuit in the computer organ described in U.S. Pat. No. 3,809,786 by coupling the Hold circuit 202 to the output of the accumulator 16 of the circuit described in the patent. At the same time the Note clock 37, rather than operating in proportion to the fundamental frequency of the note being generated, operates at 8 times the repetition frequency of the calculation cycles, i.e., $8/t_x$.

Figure 3:
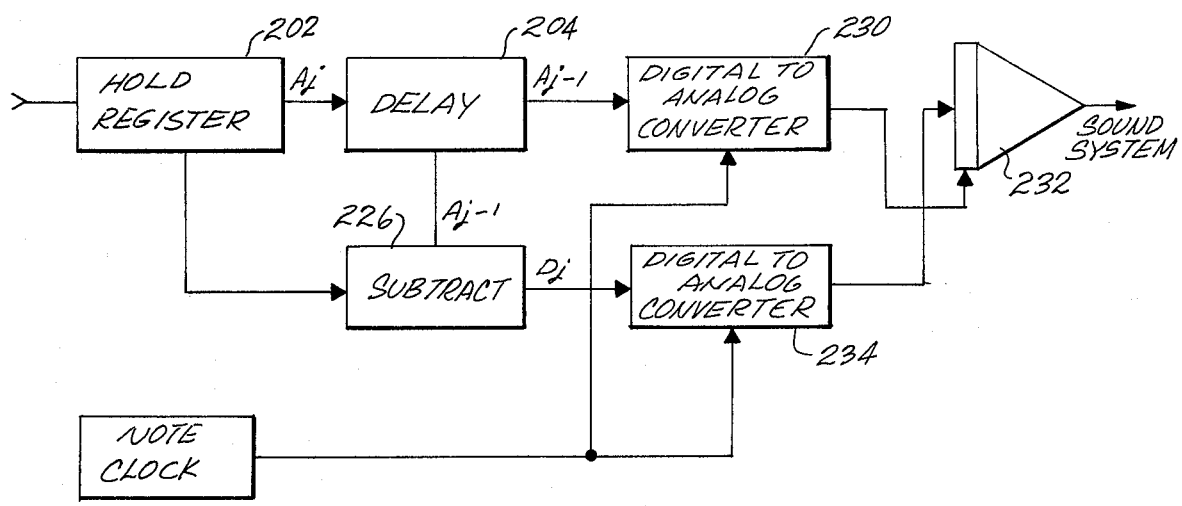
FIG. 3 is a block diagram of another embodiment of the present invention.

Referring to FIG. 3 there is shown an alternative embodiment of the noise reduction circuit which provides analog interpolation rather than the digital interpolation of the circuits described above. Again the data words from the shift register 35 are transferred successively to the Hold register 202 and the Delay register 204 so that the successive data word $A_{j-1}$ and $A_j$ are stored respectively in the Delay register and Hold register. A subtract circuit 266 coupled to the registers 202 and 204 generates a difference signal $D_j = A_j - A_{j-1}$.

The data value $A_{j-1}$ is applied to a digital-to-analog converter 230 to provide a proportional output voltage. This voltage is used to set the initial condition of an analog integrator circuit 232. The difference data $D_j$ is also applied to a digital-to-analog converter 234 to generate a proportional output voltage which is applied to the input of the analog integrator circuit 232. The output of the integrator circuit is a linearly changing voltage whose rate of change is proportional to the amplitude of the input voltage derived from the digital-to-analog converter 234. The initial voltage at the output of the integrator is proportional to the output to the digital-to-analog converter 230. As each new data word sets a new initial voltage level at the output of the integrator 232, the slope is changed according to the new difference value derived by the subtract circuit. Thus the output of the integrator provides interpolation between the voltage levels determined by successive data words, thereby providing linear interpolation between data samples.

In U.S. Pat. No. 3,515,792 there is an alternative digital organ design in which digital waveform data, rather than being stored in the form of the amplitude of successive data points, is stored in the form of the difference in amplitude between successive data points. In such case, if the sequence of amplitude points is, for example, $A_1$ through $A_{32}$, the the sequence of increments if $D_1=A_2-A_1$, $D_2=A_3-A_2$, - - - $D_{32}=A_1-A_{32}$. If the values $D_1$ through $D_{32}$ are added we find the sequence of partial sums $S_1=D_1=A_2-A_1$, $S_2=S_1+D_2=A_3-A_1$ - - - $S_{31}=S_{30}+D_{31}=A_{32}-A_1$, $S_{32}=S_{31}+D_{32}=0$. From this it will be seen that if $A_1$ is made equal to zero, then the partial sums are equal to the repetitive sequence of amplitudes $A_1$, $A_2$, - - - $A_{32}$, etc., the amplitudes of the sample points of the desired waveform.

Referring to FIG. 4, there is shown a noise suppression circuit for converting the sequence of amplitude increments to the desired analog waveform which incorporates linear interpolation.

The amplitude increment values $D_j$ are generated in sequence, for example, in the manner described in detail in the above-identified U.S. Pat. No. 3,515,792 for a digital organ. The digital data representing the amplitude increments are shifted into an adder-accumulator 250 by clock pulses from a source 252 at a predetermined rate $f_1$. This frequency may vary as a function of the fundamental frequency of the tone being generated. The adder accumulator 250 adds and accumulates the running sum of the input amplitude increments $D_j$, assuming that the sequence $D_j$ is generated in such a manner that $A_1$ equals zero.

Each amplitude increment value $D_j$ is also coupled to a Hold register 254 through a divide-by-8 circuit 256. The circuit 256 in effect does a three place right-hand shift on the binary coded input. Thus the value $D_j/8$ for each amplitude increment $D_j$ is shifted into the Hold register 254 at the clock frequency $f_1$. The value in the Hold register is gated by an AND gate 258 to the input of a second adder accumulator 260. The gate 258 is strobed by clock pulses from the source 252 at a frequency $f_2=8f_1$. The contents of the adder accumulator 250 are shifted into the adder accumulator 260 with each clock pulse from the source 252 at the clock rate $f_1$. Thus the adder accumulator 260 at the start of each clock interval contains the value of $A_j+1$. This value is then incremented in successive steps by the incremental value in the Hold register 254 during subsequent clock pulses at the pulse rate $f_2$.

The contents of the accumulator 260 are transferred to the input of a digital-to-analog converter 264 and sample and hold circuit 266 for generating a stepwise output voltage which drives a sound system 268. The sampling rate is at least at the frequency $f_2$ but may be higher. To avoid a buildup of errors in a system that adds successive amplitude increments, it may be desirable to clear the adder accumulators after each complete cycle of 32 data samples. This may be done by a Clear pulse from the clock source 252.

From the above description it will be seen that an arrangement is provided for reducing or suppressing noise produced by a digital tone generator in the digital-to-analog conerter by effectively increasing the sampling rate by introducing linear interpolation. The invention is applicable to a number of different types of digital tone generators heretofore proposed. It will be seen that the present invention is not limited to the specific tone generators described, but it is applicable to any digital tone generators in which the digital data defining the waveform limits the effective sampling rate of the digital-to-analog conversion process.

Waht is claimed is:

1. Apparatus for reducing audio noise in the musical output of a digital tone synthesizer wherein a musical tone is generated in response to a series of digital data words defining the amplitudes of a succession of equally spaced sample points on the audio signal of the tone being generated, by converting said data words to an analog voltage whose amplitude is controlled by said data and is changed in steps, comprising:

first and second register means for storing first and second ones of said data words, means transferring said series of data words successively from the first register means to the second register means at any predetermined rate, subtracting means coupled to the first and second register means including means for generating an output signal proportional to the difference in value of the digital words in the first and second register means, means for converting each data word in succession as transferred to the second register means to a voltage proportional in amplitude to the value of said data word, and integrating means responsive to the output signal from the subtracting means for changing said voltage between successive conversions of the data words at a rate determined by said signal from the subtracting means.

2. Apparatus of claim 1 wherein said means for changing said voltage includes an analog integrator means to which said signal from the subtract means is coupled, the initial output voltage condition of the integrator being set by the voltage from the means for converting each data word to a voltage.

3. Apparatus of claim 1 wherein said integrating means for changing said voltage includes an accumulator, means transferring each data word in succession from the first register means to the accumulator, and adder means for incrementing the contents of the accumulator, by an amount proportional to said signal from the subtract means in a succession of equally spaced time intervals, said means for converting being connected to the output of the accumulator to convert the successive digital values in the accumulator to an analog voltage.

4. Apparatus of claim 3 wherein the converter means includes means for sampling the contents of the accumulator periodically at a rate equal to or greater than the rate at which the accumulator is incremented by the adder.

* * * * *